C. VOLKMANN.
COTTON PICKING SPINDLE AND STRIPPER THEREFOR.
APPLICATION FILED MAR. 6, 1911.
1,227,223.
Patented May 22, 1917.
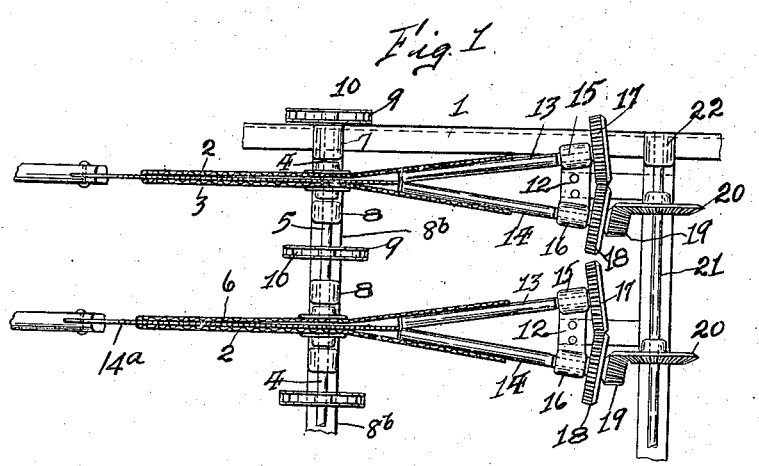
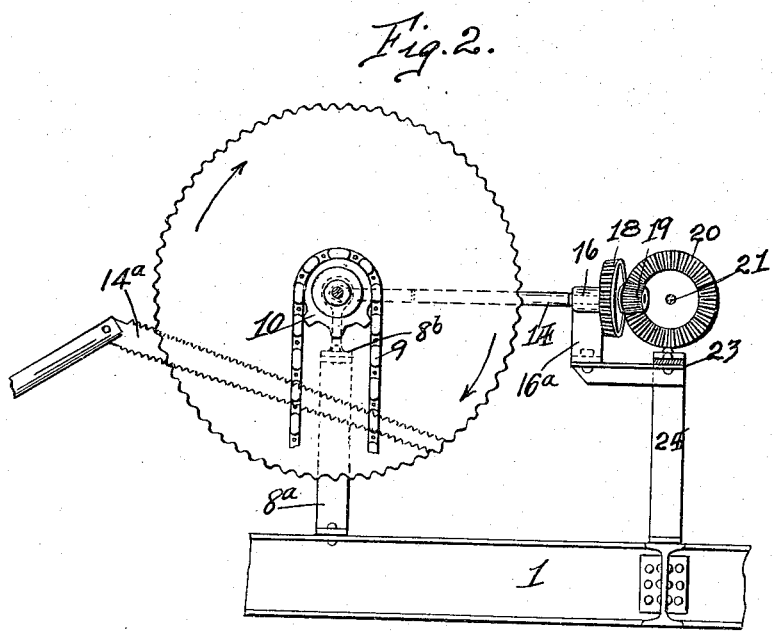
WITNESSES:
INVENTOR
Charles Volkmann,
BY Harry Lea Dodson
ATTORNEY

UNITED STATES PATENT OFFICE.

CHARLES VOLKMANN, OF CHICAGO, ILLINOIS.

COTTON-PICKING SPINDLE AND STRIPPER THEREFOR.

1,227,223.  Specification of Letters Patent.  Patented May 22, 1917.

Application filed March 6, 1911. Serial No. 612,445.

*To all whom it may concern:*

Be it known that I, CHARLES VOLKMANN, a citizen of the United States, residing at Chicago, county of Cook, and State of Illinois, have invented a certain new and useful Improvement in Cotton-Picking Spindles and Strippers Therefor, of which the following is the specification.

My improvement relates to that class of cotton pickers which employs an intermittently rotating spindle for taking the cotton from the plants and has for its object to provide an improved means for stripping the cotton from the picker and taking care of it after it is removed from the stripper.

My means for accomplishing the foregoing may be more readily understood by having reference to the accompanying drawings which are hereunto annexed and are a part of this specification, in which:

Figure 1 is a top or plan view of my improved device, only a fragment of the frame of the cotton picker being shown as it obviously constitutes no part of my invention.

Fig. 2 is a side elevation.

Similar reference numerals refer to similar parts throughout the entire description.

As shown in the drawings, 1 is a portion of the frame of the cotton picker, a fragmentary portion only being shown, as it will be obvious to persons skilled in the art, that my stripper may be employed in any one of the numerous types of strippers for cotton picking stems. The frame 1 carries standards $8^a$ on which are mounted a series of cross bars $8^b$. On these cross bars and in shaft supports 7 and 8 secured to the bars are mounted alined disconnected pieces 4 and 5 of shafting. the pieces slightly displaced from each other. The shaft pieces 4 are journaled in the shaft supports 7—7 and alternate pieces 5 are held in the shaft supports 8—8. On the ends of each of these pieces of shafting there are mounted disks 2 and 3, thus making pairs of disks in close proximity to each other. On each of the pieces of shafting I have provided sprockets 10 over which operate chain members 9 which are connected to a suitable source of power not shown. The disks and picker are rotated preferably in a clockwise direction, or in a direction indicated by the arrow shown in Fig. 2 whereby the disks move in a direction opposite to the movement of a picker $14^a$, as it passes upwardly through the stripping disks. A spreader 12 formed of two rollers 13 and 14 inclined to each other and rotatably supported in bearings 15 and 16 is located between the disks and operates to spread them apart on one side. This causes their peripheries, at a point diametrically opposite to the spreader, to press tightly upon each other, due to the flexibility of the disks 2 and 3. The bearings 15 and 16 are supported by the brackets $16^a$ secured to the uprights 24. The shafts of the rollers 13 and 14 extend beyond the bearings and are provided with bevel gears 17 and 18. The end of the shaft of the roller 14 extends beyond the bevel gear 18 and has mounted on its extreme end a bevel gear 19 which engages a bevel gear 20, rigidly attached to a shaft 21 which may be rotated by any convenient source of power (not shown). The shaft 21 is carried in suitable bearings 22 mounted upon a beam 23, which is carried by a standard 24, which extends upwardly from the frame 1.

The operation of the device is as follows:

The pickers $14^a$ are intermittently rotated by any well known means, the rotations of the pickers taking place only when the same are removing cotton from the plants. Before the pickers are passed between the disks, the same are moved to a position whereby the sides thereof are parallel with the side pieces of the disks. I prefer to use the type picking finger disclosed in the patent issued to me July 6, 1915, Patent Number 1,145,174.

The point of the picking finger is made to extend beyond the shafting 4, 5 and therefore it will enter with comparative ease between the disks where they are separated. The rotation of the disks 2 and 3 and the continued movement of the picker causes the picker to be engaged throughout its length by the disks, serving effectually to strip all of the cotton from it, while the moment that the travel of the picker takes it below this tight point it is perfectly free, due to the fact that the disks are separated immediately below the said point. The rotation of the disks 2 and 3 has a tendency to throw the cotton from the edges thereof, where it may be caught by a canvas belt, or other conveyer in any suitable or desired manner. The cotton which is not thrown from the disks, but clings to the surface is removed therefrom, by the operation of the rollers 13 and 14 which are rotated by means of the gears 17 and 18, which move in a direction opposite to the movement of the stripping disks 2 and 3. This movement serves to remove the remaining cotton off of the disks and it then falls down between the rollers 13 and 14 upon the belt conveyer, or into a receptacle, if so desired. It may be found desirable in practice, to crimp the ends of the disks and to roughen the interior walls.

Although I have shown and described a specific construction for my improved device, I do not wish to be understood as limiting myself thereto, except as such limitations may appear in the claims.

Having described my invention, what I regard as new and desire to secure by Letters Patent, is:

1. A cotton picking spindle and stripper therefor comprising a pair of rotating flexible disks, a picking spindle operating between the flexible disks, said flexible disks being rotated past the picking spindle and pressing against each other, substantially half of the surface of one side of the disks.

2. A stripper for cotton pickers, comprising the combination of a pair of rotating flexible disks, shafts on which said flexible disks are mounted, means to rotate said shafts, a spreader located between the flexible disks, said spreader adapted to spread the flexible disks apart substantially half the surfaces thereof, and to force the opposite halves of the disks together.

3. A stripper for cotton pickers, comprising the combination of a pair of rotating flexible disks having crimped edges, shafts on which said flexible disks are mounted, means to rotate said shaft, a spreader located between the flexible disks, said spreader adapted to spread the flexible disks apart substantially half the surfaces thereof and to force the opposite halves of the disks together.

CHARLES VOLKMANN.

Witnesses:
C. M. BAUMEISTER,
C. CHRISTIE.

Copies of this patent may be obtained for five cents each, by addressing the "Commissioner of Patents, Washington, D. C."